Oct. 14, 1952
Z. H. GILES
2,613,707
LUMBER CUTTING JIG
Filed Jan. 13, 1950
2 SHEETS—SHEET 1
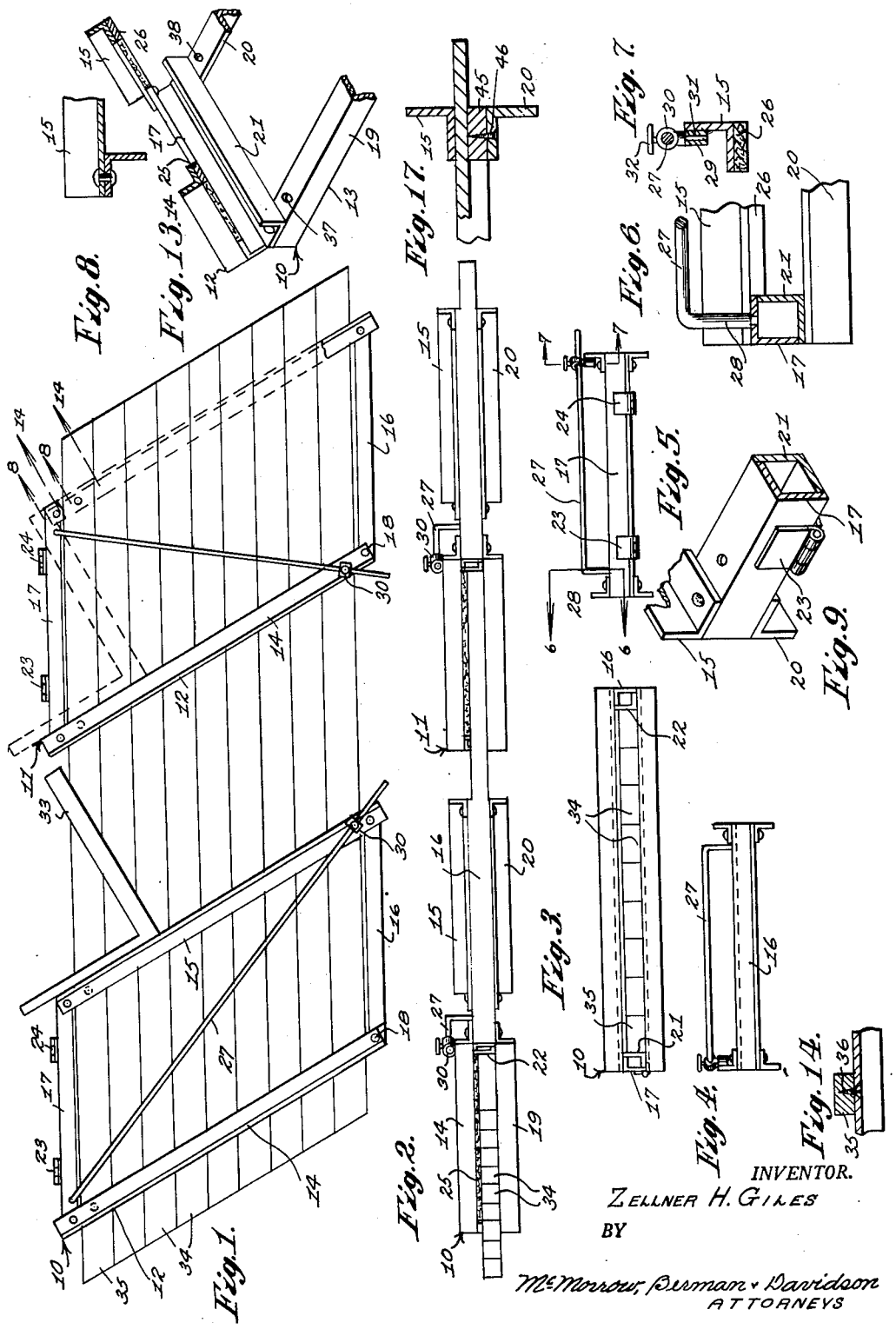
INVENTOR.
ZELLNER H. GILES
BY
McMorrow, Berman & Davidson
ATTORNEYS Oct. 14, 1952                Z. H. GILES                2,613,707
                          LUMBER CUTTING JIG
Filed Jan. 13, 1950                              2 SHEETS—SHEET 2
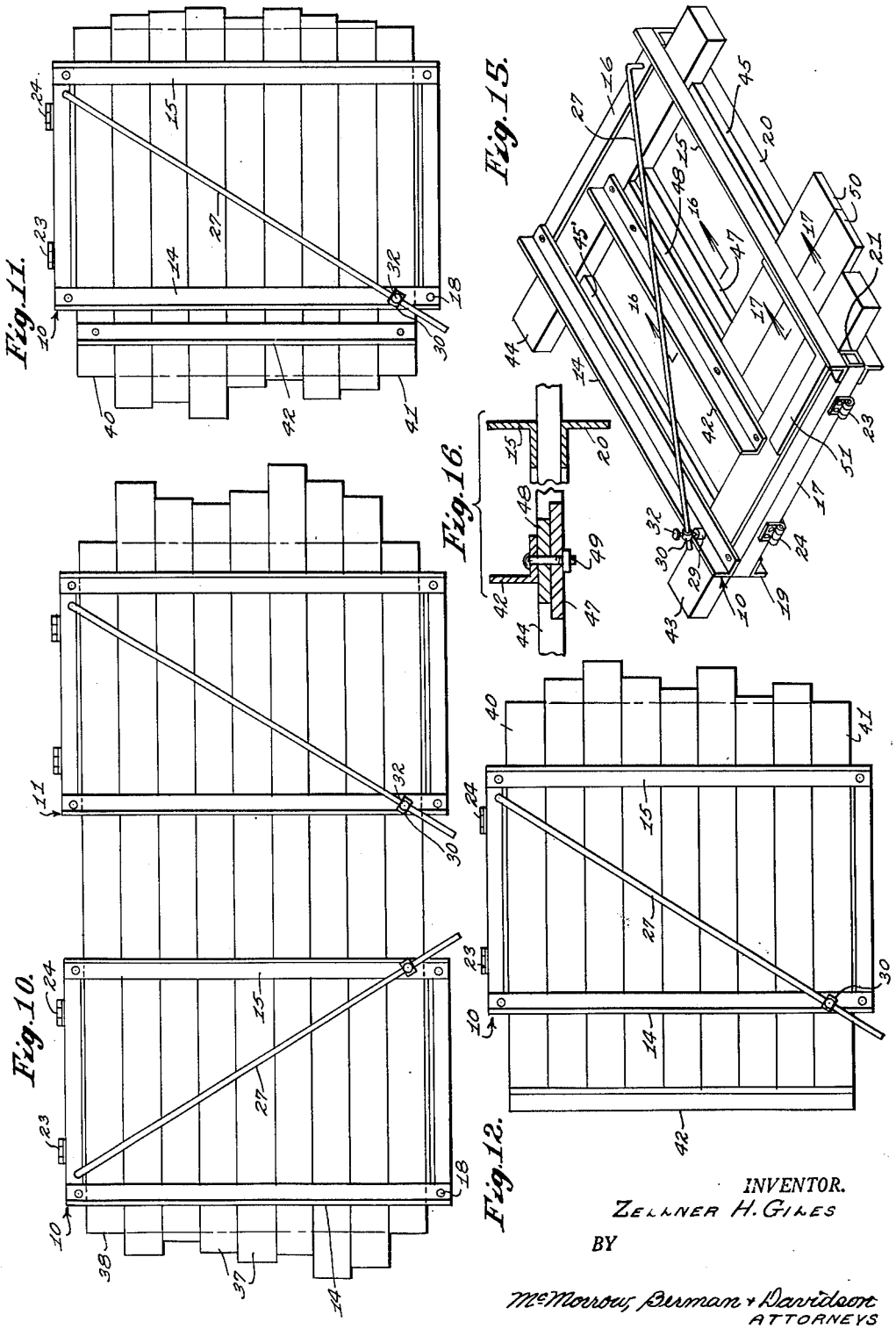
INVENTOR.
ZELLNER H. GILES
BY
McMorrow, Berman & Davidson
ATTORNEYS Patented Oct. 14, 1952

2,613,707

UNITED STATES PATENT OFFICE 2,613,707

LUMBER CUTTING JIG

Zellner H. Giles, Pinole, Calif.

Application January 13, 1950, Serial No. 138,459

2 Claims. (Cl. 144—289)

This invention relates to lumber cutting jigs and more particularly to a jig or frame for cutting lumber to form such building components as rafters or studs in large quantities.

It is among the objects of the invention to provide an improved lumber cutting jig which is effective to receive a pattern piece and a number of work pieces and guide a saw, particularly a power operated portable saw, to cut all of the work pieces to the same length and shape as the pattern piece, which can be used in single or multiple units for cutting the work pieces at one end or cutting short work pieces at both ends, or for cutting longer work pieces at both ends and, when desired, providing different angles to the cuts at the opposite ends of the same work piece, which is effective to hold the pattern piece and work pieces firmly therein and provide for the rapid and easy insertion and removal of work pieces, which can be easily adjusted to provide square or angular cuts at the ends of the work pieces and is firmly held in adjusted condition, and which is simple and durable in construction, economical to manufacture, of light weight and freely portable, and easy to use.

Other objects and advantages will become apparent from a consideration of the following description and the appended claims in conjunction with the accompanying drawings wherein:

Figure 1 is a top plan view of a multiple unit lumber cutting jig illustrative of the invention with a pattern piece and cut work pieces therein;

Figure 2 is a side or edge elevation of the jig, pattern and work piece assembly illustrated in Figure 1;

Figure 3 is an end elevation of the assembly illustrated in Figure 1;

Figure 4 is an end elevation of a single jig unit when adjusted to rectangular condition;

Figure 5 is an end elevation of the opposite end of a jig unit from that illustrated in Figure 4;

Figure 6 is a cross section on an enlarged scale on the line 6—6 of Figure 5;

Figure 7 is a cross section on an enlarged scale on the line 7—7 of Figure 5;

Figure 8 is a cross section on an enlarged scale on the line 8—8 of Figure 1;

Figure 9 is a perspective view of a fragmentary portion of a jig unit showing structural details of the unit;

Figure 10 is a top plan view similar to Figure 1 but showing the two jig units spaced apart and adjusted to rectangular condition and pattern pieces and uncut work pieces secured in the jig units;

Figure 11 is a top plan view of a single jig unit adjusted to rectangular condition with pattern pieces and uncut work pieces therein and a saw guide attached to the pattern pieces adjacent one side of the jig;

Figure 12 is a view similar to Figure 11 but with the saw guide omitted and a straight edge abutting the ends of the pattern pieces and work pieces at one side of the jig;

Figure 13 is a perspective view of a fragmentary portion of one of the jig units when in partly open condition;

Figure 14 is a cross section of a fragmentary portion of one of the jigs on the section line 14—14 of Figure 1;

Figure 15 is a perspective view of the jig when set up for cutting short lengths of lumber thinner than that shown in the previous figures for making joist bridging, fire stops and similar components;

Figure 16 is a cross sectional view on the line 16—16 of Figure 15; and

Figure 17 is a cross sectional view on the line 17—17 of Figure 15.

With continued reference to the drawings, Figures 1, 2 and 3 illustrate the use of two jigs for cutting rafters, Figure 10 illustrates the use of two jigs for cutting long, square end members such as scantling or studs, Figure 11 illustrates the use of a single jig and an auxiliary saw guide for squaring both ends of short building component members, and Figure 12 illustrates the use of a single jig unit for squaring one end of a group of contiguous members the opposite ends being already square and abutted against a straight edge.

In Figures 1, 2 and 10 the two jig units used are generally indicated at 10 and 11 and in Figures 11 and 12 the single jig unit used is generally indicated at 10. As the jig units 10 and 11 are substantially identical in construction and operation a detailed description of only one is considered necessary for the purposes of the present invention and the unit 10 has been selected for this purpose and illustrated in detail in Figures 4, 5, 6, 7, 8, 9, and 13. The jig unit 10 comprises two frame assemblies 12 and 13 of which the assembly 13 includes two spaced apart side members 14 and 15 disposed substantially parallel to each other and two end members 16 and 17 pivotally connected at their opposite ends to the spaced apart side members 14 and 15 and disposed at respectively opposite ends of the frame.

The side members 14 and 15 are preferably formed of lengths of standard angle iron of small size and each of these side members has one leg projecting inwardly toward the opposite side member and one leg extending in a direction away from the end members 16 and 17. The end members 16 and 17 are also angle iron members and each has one leg substantially in the plane of the surfaces of the side members to which the end members are connected and one leg extending substantially perpendicularly away from the side members. The end members are pivotally connected to the side members by suitable means such as the bolts or rivets 18 so that the side members can be disposed at various angles relative to the end members but the two side members and the two end members will always remain substantially parallel to each other.

The frame 13 includes two side members 19 and 20 which are spaced apart and disposed substantially parallel to each other and two end members 21 and 22 pivotally connected at their opposite ends to the two spaced apart side members 19 and 20 and disposed at respectively opposite ends of the frame 13.

The side members 19 and 20 are formed of light angle iron and each has one leg directed inwardly toward the opposite side member and its other leg extended perpendicularly away from the end members. The two end members 21 and 22 are also formed of light angle iron and each has one leg disposed flat upon the inwardly projecting legs of the side members and one leg extending perpendicularly away from the side members. The end members 16 and 17 of the frame 12, hereinafter referred to as the upper frame, have their perpendicularly extending legs at those edges of the legs attached to the side members 14 and 15 nearest the corresponding ends of the frame while the end members 21 and 22 of the frame 13, hereinafter referred to as the lower frame, have their perpendicularly extending legs at the inner edges of the legs of these end members attached to the side members 19 and 20.

With this arrangement when the upper frame 12 is superimposed upon the lower frame 13, the upper frame end member 17 and the corresponding lower frame member 21 fit together to provide a hollow structure of rectangular cross sectional shape, as is particularly illustrated in Figures 5 and 6 and the end members 16 and 22 of the upper and lower frames fit together to provide a similar hollow structure of rectangular cross sectional shape, as shown in Figure 3.

The end members 17 and 21 are connected together by hinges 23 and 24 so that the corresponding ends of the two frames 12 and 13 will be hinged together while the opposite ends of the frames can be separated for the insertion of work pieces into the jig between the upper and lower frames and the removal of work pieces therefrom.

A strip 25 of compressible material, such as ordinary weather stripping is secured to the under surface of the side member 14 of the upper frame 12 while a similar strip 26 of compressible material is secured to the under surface of the side member 15 of the upper frame. The legs of the end members 16, 17, 21 and 22 have a width which is greater than the thickness of the lumber to be held in the jig by an amount somewhat less than the thickness of the strips 25 and 26 so that these strips will be compressed against the lumber to hold the lumber firmly in the jigs. For example, if the lumber is ordinary framing lumber having a thickness of one and three fourths inches and the strips 25 and 26 have a thickness of approximately one quarter of an inch the width of the legs of the angle iron end members should be approximately one and seven eighths inches. The side members, 14, 15, 19 and 20 can also be conveniently made of one and seven eighths inch or two inch angle iron.

An elongated brace rod 27 extends diagonally across the upper frame 12 of the jig and has at one end a perpendicular extension 28 the end of which is pivotally received in a hole provided in the end member 17 near one end of the latter. An apertured bracket 29 is secured to the upstanding flange of the side member 15 near the end member 16 and a sleeve 30 is swivelly connected to this bracket by suitable means, such as the pin 31 extending from the sleeve through the aperture in the bracket. The brace rod 27 extends slidably through the sleeve 30 and a set screw 32 is threaded through an aperture in the sleeve and bears against the brace rod to lock the brace rod at selected positions of adjustment relative to the sleeve.

With the set screw 32 loosened the two frames 12 and 13 can be skewed to various angular positions of the side members relative to the end members thereof, as illustrated in Figure 1, the angle being measured by suitable means, such as the carpenter's framing square 33, or indicated by suitable marks on the portion of the rod 27 slidably received in the sleeve 30 for angularly cutting the ends of building components such as the rafters 34 illustrated in Figure 1.

In using the jig the upper frame 12 is raised, as illustrated in Figure 13, and a pattern piece 35, already cut or marked to the desired size and shape, is placed on the side members 19 and 20 of the lower frame and against the upstanding leg of the end member 21 of this lower frame. The pattern piece is secured in position on the lower frame by suitable means such as bolts 36, Figure 14, extending through the pattern piece and through holes 37 and 38 provided in the inwardly projecting legs of the side members 19 and 20 respectively and adjacent the end member 21. The set screw 32 is then loosened and the two frames of the jig brought to a rectangular condition or to the desired angularity and the set screw is tightened to hold the frames in the desired condition of adjustment. The upper frame is then again raised and uncut pieces of lumber of the proper size and length are placed between the upper and lower frames of the jig until the jig is substantially filled whereupon the upper frame is lowered to clamp these members in position in the jig.

When the pattern piece is set in the jig its end is spaced from the adjacent side member of the upper jig frame a distance equal to the width of the saw to be used in cutting the lumber. After the uncut pieces of lumber are secured in the jig the saw is run across the end of the group of contiguous pieces of lumber using the side member of the upper jig frame as a guide for the saw so that the ends of all of the pieces will be cut either square or to the exact angle at which the jig is set.

In cutting long pieces of lumber, such as rafters and joists, two of the jig units are used in spaced apart relationship to each other and the lumber is secured between the upper and lower frames of both jig units. The second jig unit is set at the same angle as the first jig unit 10 if it is desired to have both ends of each piece of lumber cut at the same angle. If different angles are required at the opposite ends of the pieces of lumber then the angularity of both jigs must be adjusted before the second cut on the group of contiguous pieces of lumber is made.

When the two jigs are used to cut lumber pieces for components, such as the studs 37 illustrated in Figure 10, a pattern piece 38 is first secured in the jigs by suitable means such as the bolts 36. The pattern piece is located at one end of the jig assembly and the pieces of uncut lumber are fitted into the jigs between this pattern piece and the opposite end of the jig assembly. The ends of the pattern piece are disposed at the proper distance from the outer side members of the upper frames of the jigs and, with the jigs secured in rectangular condition a cut is made across each end of the group of contiguous pieces of lumber reducing all of the work pieces to the length of the pattern piece and simultaneously squaring the ends of the work pieces.

In Figures 11 and 12 the single jig 10 is used to support short pieces of lumber for end cutting. In Figure 11 the two pattern pieces 40 and 41 are secured in the jig each with one end properly spaced from the adjacent side member of the upper jig frame. An auxiliary saw guide 42 is secured to the pattern pieces at the opposite side of the jig and properly spaced from the adjacent ends of the pattern pieces. The ends of the work pieces between the pattern pieces are then cut off using the auxiliary guide 42 as a saw guide and the side member at the opposite side of the upper jig frame as the other saw guide.

Where each work piece already has one squared end, the work pieces may be placed in the jig between the two pattern pieces 40 and 41 and the guide 42 used as a straight edge abutted against the adjacent ends of the pattern pieces and the square ends of the work pieces to save a saw cut at this end of the group of work pieces. The opposite end of the group is then cut using either the adjacent side member of the jig frame or the auxiliary guide 42 which may be moved to a location adjacent the uneven ends of the work pieces and secured to the pattern pieces for properly guiding the saw.

Figures 15, 16 and 17 illustrate one of the jigs arranged for cutting short pieces of one inch instead of two inch thick lumber for making such building components as window cripples, fire stops and joist bridging.

In this arrangement two pattern or gauge pieces 43 and 44 of two inch framing lumber are placed in the jig 10, one against the end piece 21 and the other against the end piece 22 and project beyond the side members of the jig a distance such that the side members can be used as guides for a portable power saw making a cut in alignment with the corresponding ends of the pattern pieces. These pattern pieces are secured to the bottom side members 19 and 20 by suitable means, such as wood screws extending through apertures in the jig side members 19 and 20 and screwed into the wooden pattern pieces. A wooden filler member 45 is mounted on the jig side member 20 between the pattern pieces 43 and 44 by suitable means, such as wood screws 46 extending through apertures in the member 20 and screwed into the wooden filler strip or member.

A similar filler strip or member 45' is preferably secured on the lower jig side member 19 between the pattern pieces.

As dressed two inch lumber is actually one and three quarters inches thick and dressed one inch lumber is actually only three quarters of an inch thick, the filler members will be one inch thick leaving between the adjacent surfaces of the filler strips and the upper side members 14 and 15 spaces approximately three quarters of an inch thick to receive work pieces of dressed one inch lumber.

A support piece 47 extends perpendicularly between the pattern pieces 43 and 44 between the jig side members 19 and 20 and the pattern pieces are recessed in their lower sides to receive the ends of this support member. The bottom surface of the support member is flush with the bottom surfaces of the pattern pieces and the support piece has the same thickness as the filler members 45 and 46 so that its upper surface is in a common plane with the upper surfaces of the filler members.

A gauge member 48 is secured on the upper surface of the support member 47 and this gauge member has a straight edge spaced from the adjacent ends of the pattern pieces a distance equal to the length to which the work pieces are to be cut. The guide member 42 may be placed on the upper surface of the gauge member with its ends overlapping the pattern members and secured to the pattern pieces, the support member and the gauge member by suitable means, such as the screws or bolts 49.

The gauge member 48 may have opposite straight edges unequally spaced from the corresponding ends of the pattern members so that work pieces of two different lengths may be cut by means of the same jig assembly.

The work pieces 50 have presquared ends supported on the support member 47 and abutted against one edge of the gauge member 48. These work pieces are clamped between the corresponding upper and lower side members 15 and 20 or 14 and 19 and project beyond the adjacent ends of the pattern pieces so that they can be cut to desired length by using the corresponding upper jig side member as a guide for a portable power operated saw.

The ends of member 42 are disposed inwardly of the outer edges of pattern pieces 43 and 44 so that a carpenter's square 51 can be placed on either pattern piece and against either upper side member of the jig to square the jig.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A jig for use in the mass cutting of lumber comprising a pair of quadrilateral frames each including a pair of side members disposed in spaced apart and substantially parallel relationship to each other and a pair of end members also disposed in spaced apart and substantially parallel relationship to each other and pivotally connected at their opposite ends to the ends of said side members at the respectively opposite ends of said frame, hinges connecting one end member of one frame to an end member of the other frame so that one of said frames can be superimposed on the other frame, the side and end members of one frame having the same length as the side and end members of the corresponding frame, an elongated brace pivotally connected at one end to an end member of one of said frames near one corner of the latter and extending diagonally across such frame to the diagonally opposite corner thereof, and means adjustably connecting said brace to said frame near said diagonally opposite corner to releasably hold said frame in adjusted positions of angularity of the side members relative to the end members thereof.

2. A jig for use in the mass cutting of lumber comprising a pair of quadrilateral frames each including a pair of side members disposed in spaced apart and substantially parallel relationship to each other and a pair of end members also disposed in spaced apart and substantially parallel relationship to each other and pivotally connected at their opposite ends to the ends of said side members at the respectively opposite ends of said frame, hinges connecting one end member of one frame to an end member of the other frame so that one of said frames can be superimposed on the other frame, the side and end members of one frame having the same length as the side and end members of the corresponding frame, an elongated brace pivotally connected at one end to an end member of one of said frames near one corner of the latter and extending diagonally across such frame to the diagonally opposite corner thereof, and means adjustably connecting said brace to said frame near said diagonally opposite corner to releasably hold said frame in adjusted positions of angularity of the side members relative to the end members thereof, each of said side members and each of said end members comprising a length of angle iron and the end members of said frames being so disposed that end members at each end of the jig constitute hollow structures of rectangular cross-sectional shape when one of said frames is superimposed on the other.

ZELLNER H. GILES.

REFERENCES CITED

The following references are of record in the file of this patent:

UNITED STATES PATENTS

| Number | Name | Date |
|---|---|---|
| 222,574 | Constant | Dec. 16, 1879 |
| 585,906 | Carter | July 6, 1897 |
| 812,426 | Jarman | Feb. 13, 1906 |
| 1,338,894 | Younkin | May 4, 1920 |
| 1,381,351 | Shaw et al. | June 14, 1921 |
| 1,544,290 | Walstad | June 30, 1925 |
| 1,554,497 | Goff | Sept. 22, 1925 |
| 1,700,391 | Williams et al. | Jan. 29, 1929 |

FOREIGN PATENTS

| Number | Country | Date |
|---|---|---|
| 677,230 | Germany | Jan. 21, 1939 |